Figure 1:
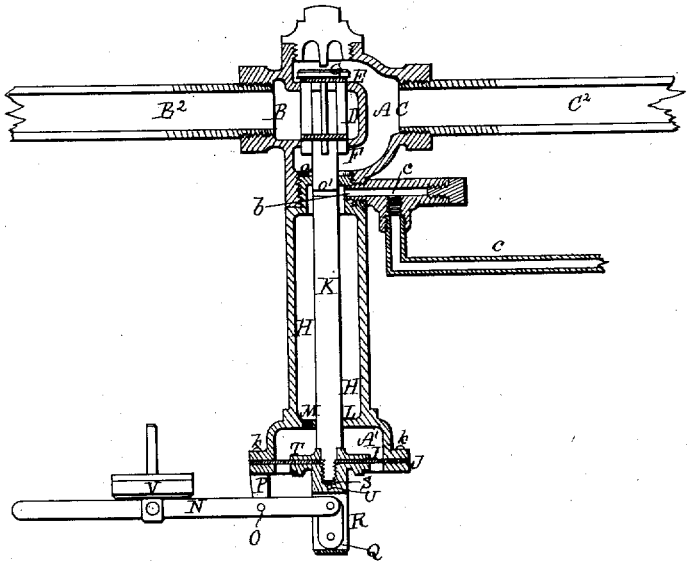

J. E. WATTS.

Steam or Water Pressure Regulator.

No. 8,124. Reissued March 12, 1878.

*Witnesses.*

J. P. Bridge

Louis A. Curtis.

*Inventor.*

Joseph E. Watts.

F. Curtis. Atty.

UNITED STATES PATENT OFFICE.

JOSEPH E. WATTS, OF LAWRENCE, MASSACHUSETTS.

IMPROVEMENT IN STEAM OR WATER PRESSURE REGULATORS.

Specification forming part of Letters Patent No. 161,917, dated April 13, 1875; Reissue No. 8,124, dated March 12, 1878; application filed February 7, 1878.

*To all whom it may concern:*

Be it known that I, JOSEPH E. WATTS, of Lawrence, in the county of Essex and State of Massachusetts, have invented certain Improvements in Pressure-Regulators, of which the following is a specification:

My present improvements relate to pressure-regulators, for regulating the pressure of steam, gas, or other fluids or liquids, in order to obtain a uniform pressure in the delivery or distributing pipe or drum, as against irregularities of pressure in the supply-pipe, or the varying quantities of steam required in the apparatus which the valve supplies; one class of regulators to which my invention is especially applicable being that shown in Letters Patent of Great Britain granted to John Parkinson, of Bury, county Lancaster, dated the 28th day of December, 1853, and in Letters Patent of the United States issued to myself on the 6th day of January, 1874, in which the stem or spindle of the regulating-valve is supported, at its lower end, upon an elastic diaphragm arranged in a closed chamber at the lower part of a pipe or tube, such stem and diaphragm being properly connected to a weighted lever or a spring to act upon the valve-stem and valve, and open or close the valve in consonance with variations in the pressure in the delivery or distributing pipe or drum, or the apparatus supplied with fluid, which the valve is designed to govern.

My invention consists, mainly, in the employment of a pipe, which is connected at one end with the orifice in the well-tube, and at the other with the interior of the supply pipe or drum, to which the various branch pipes that supply the driers with steam are attached.

Should the pressure in the service-pipe fall below the maximum, the pressure upon the column of water in the well and upon the diaphragm will be lowered to such an extent that the lever partially overcomes the pressure and raises the valve, and admits an increased amount of steam to the drum until the maximum pressure is restored. Should the pressure exceed the proper point, steam will enter the well and produce the reverse motion upon the valve.

In carrying out my invention, in one form in which I have practically used the independent pipe before alluded to, I shut off communication between the fluid-chamber of the valve and the condensed-water well or tube below, and create in the case or column of such valve or said tube, and communicating with the interior thereof, an orifice, with which I connect one end of the said independent pipe, the other end of said pipe to be connected with the interior of the delivering or distributing pipe or drum at such point in the latter as circumstances or conditions may determine best.

Figure 2:
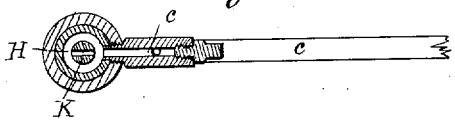

The drawings accompanying this specification represent, in Figure 1, a vertical section, and in Fig. 2 a horizontal section, of a pressure-regulator valve with my invention applied thereto.

In these drawings, A represents the case of the regulator valve, which, in the present instance, is a "balanced plunger-valve," so called, the inlet-port of such valve-case being shown at B, and its eduction or discharge port at C, while the fluid-supply pipe, which supplies fluid to the valve-case through the said port B, is shown at $B^2$, and the service-pipe, which connects with the port C and receives the fluid as it leaves the valve-chamber, at $C^2$. The service-pipe $C^2$ communicates with, or itself constitutes, the first part of the distributing pipe or drum, to which allusion is hereinafter frequently made, the connections of the pipe varying with the class of machines to which the regulator is attached.

In carrying my improvement into practice, in one manner in which it may be applied, I close, or practically close, the upper part of the well-tube H by a horizontal shelf, *a*, which, in addition to closing the well, constitutes also a guide or bearing, to steady the valve-stem or spindle K. I then create in the tube H an orifice, *b*, which communicates with the interior of such well, and I dispose this orifice, preferably, at the extreme upper part of the tube, as shown, in order that a considerable column of water may stand over the elastic diaphragm, to protect the latter from contact with hot steam. I next provide a pipe, *c*, (which virtually constitutes the subject of my invention,) and connect one end of such pipe with the orifice *b*, and the other end of such pipe, whatever the distance from the regulator such end may be, I connect with the interior of the service or distributing pipe $C^2$ at such a point in the latter as circumstances and the nature of the machine supplied shall dictate; for while my invention is not dependent upon any precise point at which this connection shall be made, I prefer it shall be at the remote end of the distributing-pipe, as by so doing I am enabled to govern the regulating-valve from this point, and maintain a uniform pressure where the connection of the pipe *c* is made.

We will suppose, for illustration, that a valve with my improvement added is to be applied to a stack of drier-cylinders, such as are used in print-works. Heretofore, as greater or less quantities of cloth pass over the cylinders, or such cloth contains a greater or less percentage of moisture, the pressure of steam at the remote end of the pipe $C^2$—say, at or near the last cylinder—varies considerably, owing to the varying condensation in the previous cylinders, and at times—say, for instance, when the cloths are very wet—such pressure will run too low to maintain the requisite temperature in the cylinders, and at times—for instance, when few or no cloths are running over said cylinders, or said cloths contain a small percentage of moisture—steam runs to waste.

When great work is put upon the cylinders, and a large amount of steam required and used at the point of intersection of the pipe *c* with $C^2$, the pressure in the first part of the distributing-pipe $C^2$ would be increased very considerably, and a great difference exist between the pressure at this point and at the last cylinder, where the pipe *c* is connected; while if work is taken off the cylinders, the pressure at these two extreme points would be nearer equal, as it would rise considerably at the point of intersection of the pipe *c* with $C^2$ and blow off to waste.

With my invention, should the pressure at the remote end of the distributing-pipe $C^2$, or at any point therein between the connection of the pipe *c* and the valve A, fall below the average degree which is expected to be maintained, the pressure upon the column of water in the well H and diaphragm I through the pipe *c* will be lowered to such an extent that the lever N or its weight partially overcomes the pressure and raises the rod K and valve G, and admits an increased amount of steam to the pipe $C^2$ until the maximum pressure at the point of connection of the pipe *c* is restored.

Should the pressure in the pipe $C^2$ at the point of connection of the pipe *c* exceed the desired point, the pressure in such pipe $C^2$ is exerted by means of the pipe *c* upon the body of water within the well H, and through this water, as an intervening medium, upon the diaphragm I; and the latter, as a consequence, is distended outward or downward, and the valve-stem K and the valve G lowered, thus partially closing the valve, and reducing the amount of steam passing through it into the pipe $C^2$.

It will thus be seen that by the employment of the pipe *c*, or its equivalent, an independent return route is established for pressure from the pipe $C^2$, or the steam drum or receiver, whatever it may be, to act upon the diaphragm I, which is independent of the pressure in the valve-chamber A. As a consequence, the diaphragm is influenced by the pressure from the pipe $C^2$ or its substitute, and not by the pressure direct from the valve-chamber, as has been the case prior to my invention. Therefore I govern or control the valve, as before stated, from the point of connection of the pipe *c* with the pipe $C^2$, and maintain a uniform pressure at this point, whereas, heretofore, the pressure being governed only at the valve, great fluctuations in pressure take place at various points intermediate between such valve and the remote end of the distributing-pipe, which the pipe *c* overcomes at any point in $C^2$ where it is connected.

I also reduce the pressure to a great extent upon the diaphragm I, to which it has been heretofore subjected in many regulators of this class, as in my regulator the pressure (owing to the shelf *a*) is shut off from access to the water-well direct from the valve-chamber, and can only act upon the diaphragm indirectly from the point in the pipe $C^2$ where the pipe *c* is connected through such pipe *c* as a return path.

An obvious modification of the use of the pipe *c* would be to connect one end with the diaphragm-chamber below the diaphragm, instead of above, as herein explained. Indeed, my first practical experiments were carried on in this way; but such construction would necessitate the employment of a stuffing-box at the upper part of the valve-stem, and the friction of this stuffing-box presents serious objections where nice or close regulation is required, such as in "slasher-frames" of cotton-mills. By connecting the pipe *c* at or near the upper part of the well H, and the employment of the shelf *a*, before described, I avoid the use of a stuffing-box, and the waste of power and other objections incident to overcoming its friction, which is very considerable if the packing is effective.

If the exhaust-steam from the engine which drives the driers passes into the service-pipe $C^2$ by a pipe connecting with the latter, my invention is productive of another advantage, as, by connecting the pipe *c* at the point of intersection of the pipe $C^2$ and the exhaust-pipe from said engine, I govern the valve by the pressure at this point, and thereby maintain or present a uniform back pressure upon or to the engine.

I am enabled, by the use of the pipe *c* or its substitute, to dry cloths more uniformly and desirably than heretofore, and to maintain a uniform pressure and temperature in the steaming-boxes employed to "set" the colors of prints.

The principle of the pipe *c* is applicable to many purposes which time will not permit me to dwell upon, since its operation is practically the same in all.

Furthermore, I am enabled to get access to the interior of the well H and to the valve-stem K through the orifice *b;* and by inserting a rod or pin in a hole, *o'*, created in such stem, the latter is prevented from rotating while the nut upon its lower end is being applied or removed. The orifice *b* also affords a ready means of attaching a pressure-gage, should it be desirable to do so.

I have described the main feature of my invention—that is, the pipe *c* or its equivalent—as applicable mainly to "diaphragm-regulators," so called; but it is equally applicable to piston or other regulators.

I am, of course, aware that in direct proportion to the extent of communication between the chamber of the valve A and the water-well H and orifice *b* will the proper action of the pipe *c* be neutralized, and that if the direct communication between the orifice *b* or pipe *c* and valve-chamber were an open or obstructed one, or a large space existed between the valve-stem and shelf *a*, the pipe *c* would become simply a supply-pipe, like the pipe $C^2$, and for the same reason the water in the well H would become highly heated and the diaphragm injured; but the small amount of steam which may creep between the valve-stem and shelf *a* in my apparatus and escape by the orifice *b* is so infinitesimal, in proportion to the area of the pipe *c*, as not to be taken into serious account, or to have any appreciable injurious effect. The shelf serves to shut off communication, as stated, and yet does not exert friction to any extent upon the valve-stem.

I claim—

1. The combination, with a pressure-regulator and a drum, distributing-pipe, or receiver, (the pressure in which is to be governed by such regulator,) of an independent pipe, connecting said regulator and drum, pipe, or receiver, and serving to operate the regulator by pressure from such pipe, drum, or receiver at the point where the independent pipe connects with the latter, wherever this connection with the drum, &c., may be, substantially as and for purposes stated.

2. In a steam or water pressure regulator, as described, the combination, with the regulating-valve, the fluid-chamber A, and the well-tube H, of the closing-partition *a* and the pipe *c*, leading from the distributing pipe or drum, and entering the well-tube below partition *a*, substantially as and for purposes stated.

JOSEPH E. WATTS.

Witnesses:
F. CURTIS,
LOUIS A. CURTIS.